Aug. 3, 1937.    G. BUCKY    2,088,584
APPARATUS FOR THE DETECTION OF MINUTE CURRENT OR VOLTAGE CHANGES
Filed Oct. 24, 1933
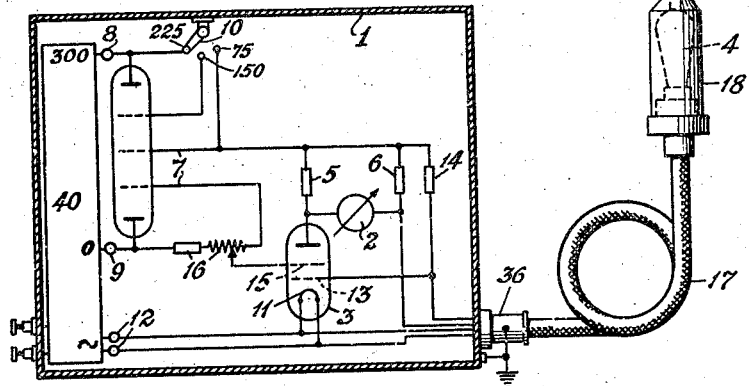
Fig. 1.
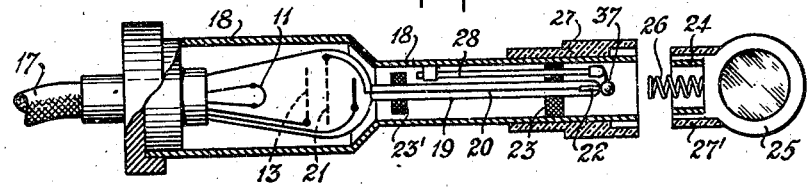
Fig. 2.
Fig. 3.
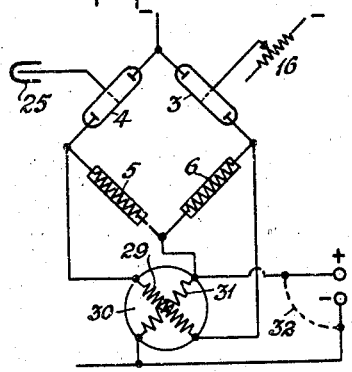
Fig. 4.
WITNESS
G. V. Rasmussen
INVENTOR
GUSTAV BUCKY
BY
ATTORNEYS Patented Aug. 3, 1937

2,088,584

UNITED STATES PATENT OFFICE 2,088,584

APPARATUS FOR THE DETECTION OF MINUTE CURRENT OR VOLTAGE CHANGES

Gustav Bucky, New York, N. Y., assignor to Roefinag Research Corporation, New York, N. Y., a corporation of New York Application October 24, 1933, Serial No. 694,977 In Germany October 25, 1932

11 Claims. (Cl. 250—41)

The invention relates to an apparatus for measuring minute electric currents or voltages and is especially adapted for apparatus for measuring the qualities and quantities of radiant energies by means of ionization chambers, photoelectric cells, and similar appliances.

An object of the invention is to provide an apparatus of extreme sensitiveness, i. e. for obtaining an acute sensitivity of measurement not obtainable by any prior system. Such sensitivity of my novel apparatus is due primarily to the use of a special type and character of glass in the amplifying tubes, which glass, in my apparatus, serves as a unit of extremely high resistance. For the attainment of such object, two amplifier tubes are arranged in a bridge coupling according to known principles, the desired measurement being obtained either by the use of an instrument having a fixed zero point, by regulating or adjusting the bridge resistances, or directly on a galvanometer included in the bridge circuit.

A feature of my novel apparatus is its great facility of handling. The simplicity of its adjustment for obtaining accurate measurements is such that its handling by a layman can give him the accuracy of results obtainable only by a physicist with other instruments of equal sensitiveness and by the use of stop-watches, check tests and similar complicating instrumentalities and devices. With my novel apparatus, a resultant reading, by mere visual observation, is obtained in as many minutes as hours were necessary for an accurate determination with prior systems.

My novel apparatus of the present invention may be used with a luminous indicating device such as is shown and described in my application entitled "Luminous indicators for measuring instruments" executed and filed concurrently with the instant application, now Patent No. 1,449,600, issued March 6, 1934, in which is employed a luminous indicator becoming visible only when predetermined values of the magnitudes intended to be measured, are reached.

A disadvantage of the prior art apparatus of this kind has been the necessity of using resistances of high ohmage in the current path of the testing device, in which path the grid of one of the tubes is located. Resistances of this kind, which are suitable for the measurement of very small currents and are therefore of correspondingly high ohmage, are expensive, unreliable, and necessitate substantially perfect insulation at their terminals and of their connecting wires. When such apparatus was used for measurements of X-rays, it was also necessary to provide therefor a casing of lead to shield the apparatus, so that the air within the apparatus may not be ionized so as to result in a falsification of readings or measurement results. This disadvantage was particularly evident with the prior art type of apparatus in which the amplifier, the galvanometer, and the coupling elements were all housed in a single casing, the connections with the ionization chamber having been accomplished by means of long conduits.

In accordance with the present invention, these disadvantages are overcome by the separation of those portions of the apparatus which require complete insulation from those portions which require less perfect insulation. In accordance with the invention, therefore, one of the amplifier tubes, i. e. that which is exposed to the effects of the ionization chamber, is separated from the casing containing the second amplifier tube, the amplifying coupling, the galvanometer, and in some instances, the device for connecting the apparatus to the power circuit.

A more particular object of the invention is the provision of the amplifier tube which has thus been separated from the remaining portions of the apparatus with a suitable and specially built glass casing serving as a resistance of very high ohmage, the connections from such amplifier tube to the rest of the apparatus being confined within a cable suitably shielded against high frequency. A still further object of the invention is to provide a novel construction of such amplifying tube, as hereinafter more fully described.

In the drawing, I have illustrated schematically a specific embodiment of my invention in its application to an X-ray dosage meter, although it is to be understood that this application of my novel apparatus is shown by way of illustration rather than by way of limitation. The particular set-up of the apparatus for use as an X-ray dosage meter includes my novel amplifier unit, such amplifier unit, however, being capable of forming an element in any system designed for the measurement of small electric currents or voltages in any of a large number of technical or physical determinations.

In the illustrated embodiment of my invention, I utilize two amplifier tubes included in a Wheatstone bridge arrangement which comprises such amplifier tubes and two resistances. In the system is included also a potentiometer from which various constant voltages may be obtained.

In the drawing, Fig. 1 is a plan view of the apparatus, the housing being shown in section and the housed apparatus schematically. Fig. 2 is an enlarged section of the amplifying tube, the ionization chamber being shown in plan. Fig. 3 is an enlarged sectional view of a part of Fig. 2. Fig. 4 is a schematic view of a modified-circuit arrangement.

In Fig. 1, within a casing 1 is mounted an open face galvanometer 2 lying in the connection between two diagonal points of the Wheatstone bridge, which latter comprises two amplifier tubes 3 and 4 and two resistances 5 and 6. In the connection between the other two diagonal points of the bridge lies the source of current 7, the current being delivered from a tube potentiometer, serving as a voltage stabilizer, connected to the main circuit of approximately 300 volt potential by contacts 8 and 9. Secured to the wall of the metallic casing 1 is the grounded switch lever or contactor 10 which makes possible the obtaining of a plurality of voltages from the potentiometer, for instance, 225, 150, or 75 volts, depending upon which of the various voltage points of the potentiometer is engaged by the lever 10. The use of the tube potentiometer, as a source of voltage, eliminates the fluctuations existing in the primary voltage derived from the main power lines. The cathodes 11 of the amplifier tubes are connected through contacts 12 to the main power lines. The tubes are provided with "space-charge-effect" grids 13 which, through a regulatable resistance 14, are connected to the positive terminal of the Wheatstone bridge. The regulating electrode 15 of the amplifier tube 3, i. e. that within the casing 1, receives its potential through a variable resistance 16.

The amplifier tube 4, outside of the casing 1, is connected by means of a cable 17, insulated against high frequency, with the amplifying unit in casing 1. The amplifier tube 4 is housed in a chamber 18 at one end of the cable 17, the other end of said cable being secured within a copper sheathing 36 connected to the main line by contacts 12 and also to the grounded casing 1.

The amplifier tube 4 and its associated elements are shown in enlarged detail in Fig. 2. The tube 4 is provided with an elongated neck 19, constructed of a suitable, special, type of glass, of a high resistance character (of the order of about $10^{+12}$–$10^{+14}$ ohm). Glass of this character is obtainable on the market in response to a call for glass of maximum high resistance character. Its composition and methods of production are well-known to the art which manufactures such glass. Such glass has heretofore been used where insulation was the only object but in the present case as will be hereinafter explained it is employed for this purpose in one part of the structure while in another part it serves as a high resistance. Through the neck 19 runs a connection 20 from the regulating electrode 21 of the amplifier tube to a plug 22 led through the end of the neck 19. The plug 22 is provided, on its end exteriorly of the neck 19, with a globular projection 37. The neck 19 is insulated from the chamber 18 by a gas-tight amber ring 23. An ionization chamber 25, to which is secured an electrode 24, and provided with a spring 26 for contact with the projection 37, comprises a separate unit which may be brought into engagement with the end of the neck 19 by interengagement of its lead casing 27' with the lead casing 27 surrounding the outer end of the chamber 18. The chamber 18 may be made of a thin and light weight metal (such as chromium) as it is amply protected by the lead casing 27. The lead casing 27 protects the end of the chamber 18 from the effects of any X-rays that may possibly reach such end of the chamber. In order to secure a more perfect insulation of the chamber 18, the neck 19 thereof may be provided with a second amber ring 23', also secured in air-tight position on such neck. This second amber ring serves at the same time to arrest the seepage along the glass of any moisture that may deposit on the surface of the glass neck 19.

In the use of my apparatus in connection with an X-ray dosage meter, the current potential in the ionization chamber, i. e. the X-ray intensity, may be read on the potentiometer resistance 16, the scale of which is suitably calibrated when the galvanometer 2 is brought to its zero position, so that the current conditions in the amplifier tube 3 conform to those in the amplifier tube 4.

The galvanometer may also be used as a deflection instrument, the resistance 16 then serving only as a zero point determinator, remaining unchanged during the measuring operation.

It is to be noted that the deflection of the galvanometer may be steadied if a resistance of large ohmage is coupled to the ionization chamber 25. Such a resistance may take the form of a glass rod 28 positioned within the tube casing 18, such glass rod being coupled at one end to the plug 22 and at the other end to the wall of the casing 18.

From a source of power 40 (Fig. 1) current is derived from the contacts 12 to heat the filaments 11 of the tubes 3 and 4. From the contact 9 a potential is derived for the grid 15 of tube 3, which potential may be regulated by the resistance 16. Potentials for the plates of the tubes 3 and 4 are derived over the resistance 5 and 6, respectively. Potentials for the grid 13 are derived over the resistance 14 from point 7. It should be noted that the tubes 3 and 4 and the resistances 5 and 6 form, together, a Wheatstone bridge. The instrument 2 is used as the bridge galvanometer and points to zero when no radiation impinges upon the device which is sensitive to it. In the drawing an ionization chamber 25 sensitive to X-rays is shown as illustrative of a device sensitive to radiation. An electrode 25 of the ionization chamber is connected to the grid 21 of tube 4 by means of spring 26, the globular projection 37, the plug 22, and the conductor 20. Whenever the electrode 25 of the ionization chamber is exposed to radiation a current passes not only to the grid 21 as described, but also through the resistance 28 to the casing 18 and produces a potential drop in the resistance 28. The change in potential in the grid 21 upsets the balance of the Wheatstone bridge, causing a deflection of the galvanometer 2. This galvanometer may either be read directly or, when using a zero method, may be compensated by adjusting the resistance 16, which in this event is calibrated.

In Fig. 3, I have shown a modified form of the neck-like extension of the amplifier tube 4. In this modification, the tube neck 19 is mounted on a multi-armed glass support 33, the arms of which are propped, by means of soldered platinum wires, against the plug 22 and against the wall of the chamber 18. For arresting the seepage of any moisture upon the surface of the tube neck 19, three amber rings 23' are secured in air-tight position on such neck.

Instead of the ordinary amplifier tube, there may be used a differential instrument 30, which, as shown diagrammatically in Fig. 4, is connected to the coil 29 on the diagonal points of the bridge 3, 4, 5, 6, the other coil 31 lying in the supply lead wires of the bridge. The coil 29 in this instance serves as a normal galvanometer coil, the coil 31 serving as a corrective means for the zero point, the zero point possibly varying by reason of the deterioration of the heat cathodes of the amplifying tubes or from the effects of the "valve grid" of the amplifier 3 in casing 1. The points of connection of the coils are so selected that the fluctuations of the outer amplifier 4 caused by the effects of the ionization chamber 25 are magnified on the galvanometer 30, while the fluctuations of the amplifier tube 3 are reduced on such galvanometer.

The calibration of the galvanometer 30 is accomplished as follows: The coil 31 is short-circuited by shunt 32, the resistance 16 being then set to the accurate zero point of the galvanometer. After removing the shunt 32, a counter-electromotive force (plus—minus), which is also taken from the tube potentiometer, is connected to the coil 31 until the zero point on the galvanometer is again reached. The galvanometer is now ready for ionization measurement, the measured values being readily readable on the scale of the galvanometer without adjustment of the resistance 16. For calibration purposes, the galvanometer scale may be movable, such movable scale being provided with a knob or similar device, so that the movable scale is capable of regulation with respect to the permanent zero point.

The apparatus of my invention makes possible the detection of extremely minute current or voltage changes and may therefore be utilized in innumerable cases where accurate technical or physical determinations of current or voltage values are to be made. Besides its great practicability for the measurement of X-ray dosages, in connection with which use I have particularly described my invention, my apparatus may be used to advantage for the measurement of rays of all kinds, from heat rays to gamma rays. It may also be used in the measurement of resistances, particularly for the testing of insulation; in electrical temperature measurements with resistances or thermal elements; in photometric measurements; in electro-cardiographic or orthodiagraphic research; in the determination and measurement of spectral curves in physics or astronomy; in the measurement of luminescence and phosphorescence; in the measurement and control of light intensities used in making sound pictures; and for many similar purposes.

I claim:

1. In an apparatus for measuring radiant energies, a radiant-responsive device, a galvanometer for indicating the response of said device, and an amplifying tube associated with said responsive device, said amplifying tube having a control electrode, an element sensitive to radiation to which it is to be exposed located at a distance from said electrode, a conductor connecting said electrode with said element, and an insulating neck constructed of glass of extremely high resistance character, for instance, of the order of approximately $10^{+12}$ to $10^{+14}$ ohms, and a resistance of high ohmage mounted in parallel relation to said amplifier tube neck, whereby the indicator of said galvanometer is steadied by the elimination, by said resistance, of such capacitances, and their effects as would cause undesirable oscillations, and therefore deflections, of said galvanometer indicator.

2. In an apparatus for measuring radiant energies, a radiation-responsive device, a galvanometer for indicating the response of said device, and an amplifying tube associated with said responsive device, said amplifying tube having a control electrode, an element sensitive to radiation to which it is to be exposed located at a distance from said electrode, a conductor connecting said electrode with said element, and an insulating neck constructed of glass of extremely high resistance character, for instance, of the order of approximately $10^{+12}$ to $10^{+14}$ ohms, and a resistance of high ohmage in the form of a glass rod constituted of the same character of glass as the neck of the amplifier tube mounted in parallel relation to said amplifier tube neck, whereby the indicator of said galvanometer is steadied by the elimination, by said resistance, of such capacitances and their effects as would cause undesirable oscillations and therefore deflections, of said galvanometer indicator.

3. In an apparatus for measuring radiant energies, a radiation-responsive device, a galvanometer for indicating the response of said device, and an amplifying tube associated with said responsive device, said amplifying tube having a control electrode, an element sensitive to radiation to which it is to be exposed located at a distance from said electrode, a conductor connecting said electrode with said element, and an insulating neck of extremely high resistance character, a resistance of high ohmage mounted in parallel arrangement to said amplifying tube neck and a metal casing surrounding the whole of said amplifying tube, said elongated neck and said resistance of high ohmage, and an air-tight seal between the casing and said radiation-responsive device.

4. In a device as described in claim 3 in which the outer end of the chamber formed by the metal casing is provided with an air-tight seal of insulating material through which the neck and the resistance of high ohmage project.

5. An apparatus such as described in claim 3 in which the end, at least, of the casing furthest from the amplifying tube is enveloped by lead to protect that end of the chamber within the casing from the effects of radiant energy.

6. An apparatus such as described in claim 3 in which the end, at least, of the casing furthest from the amplifying tube, as well as the seal with the radiation-responsive device, are enveloped by lead to protect that section of the device within the casing from the effects of radiant energy.

7. In an apparatus for measuring radiant energies, a radiation-responsive device, a galvanometer for indicating the response of said device, an amplifying tube connected between said responsive device and said galvanometer and having an anode, a cathode, and at least one control electrode, an element sensitive to radiation to which it is to be exposed located at a distance from said electrode, a conductor connecting said electrode with said element, and an insulating glass neck of extremely high resistance for said amplifying tube, and a resistance of high ohmage mounted in parallel relation to said amplifying tube neck and connected with said control electrode.

8. In an apparatus as described in claim 7 in which said amplifying tube is provided with a second control electrode and a circuit for controlling said galvanometer including a connection to said second control electrode.

9. Apparatus comprising a radiation-responsive device and an amplifier tube operatively connected therewith, said responsive device and amplifier tube mounted as a unit in a portable metal casing, constituting a shield for said amplifier tube against radiant energy, a galvanometer, a control circuit therefor to indicate the response of said device and a shielded flexible cable extending between said amplifier tube and the galvanometer control circuit.

10. An apparatus as described in claim 9 in which the galvanometer control circuit includes a second amplifier tube, and a metal shield enclosing the whole of said control circuit and the second amplifier tube.

11. Apparatus as described in claim 9 in which the galvanometer control circuit includes a second amplifier tube and a voltage-stabilizing device, and a metal shield surrounding the whole of said galvanometer control circuit, second amplifier tube, and voltage stabilizing device.

GUSTAV BUCKY.